United States Patent [19]

Culbertson et al.

[11] 4,374,235
[45] Feb. 15, 1983

[54] ANHYDRIDE CONTAINING POLYMERS DERIVED FROM ALKENYL SUCCINIC ANHYDRIDE

[75] Inventors: Billy M. Culbertson, Worthington; Larry K. Post, Columbus, both of Ohio; Ann E. Aulabaugh, Madison, Wis.

[73] Assignee: Ashland Oil, Inc., Ashland, Ky.

[21] Appl. No.: 234,750

[22] Filed: Feb. 17, 1981

[51] Int. Cl.³ .................. C08F 222/04; C08F 222/06; C08F 222/08; C08F 222/40
[52] U.S. Cl. .................................... 526/262; 428/436; 428/460; 525/117; 526/271; 526/272
[58] Field of Search ....................... 526/272, 271, 262

[56] References Cited

U.S. PATENT DOCUMENTS 2,440,985  5/1948  Sutherland ............................ 260/36
3,157,599  11/1964  Gloor .................................... 252/8.5

FOREIGN PATENT DOCUMENTS 48-43191  12/1973  Japan ................................... 526/272

OTHER PUBLICATIONS

Shell Chemical Company, *Technical Bulletin*, "Epon Resins," Aug. 1962, pp. 1-5.

*Primary Examiner*—Stanford M. Levin
*Attorney, Agent, or Firm*—Wood, Herron & Evans

[57] ABSTRACT

A novel polymer comprising the reaction product of a first vinyl monomer and a second vinyl monomer which is an alkenyl succinic anhydride having the formula:

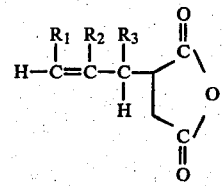

These polymers are useful as epoxy curatives, boiler scale removers, detergent builders, thickeners and coatings.

9 Claims, No Drawings

ANHYDRIDE CONTAINING POLYMERS DERIVED FROM ALKENYL SUCCINIC ANHYDRIDE

BACKGROUND OF THE INVENTION

This invention relates to a polymer containing a succinic anhydride group.

Specifically, this invention relates to a polymer which contains a succinic anhydride group in which the succinic anhydride group does not form a part of the polymer backbone.

More specifically, this invention relates to a polymer formed from an alkenyl succinic anhydride in which the alkenyl portion is reacted with a double bond of one or more reactive vinyl monomers to produce a copolymer or terpolymer in which the succinic anhydride group does not form a part of the polymer backbone, but rather is attached to the polymer by means of an alkyl chain which extends from the second or third positions of the succinic anhydride ring to the polymer backbone.

Polymers which incorporate a succinic anhydride group are well known. Typically, these polymers are formed by reacting maleic anhydride with a second vinyl monomer in the presence of a free radical polymerization catalyst. In such a reaction, the double bond of maleic anhydride reacts with the double bond of the second vinyl monomer, thereby producing a polymer containing succinic anhydride in which the carbon atoms at the two and three position of the succinic anhydride group are directly attached to other monomers in the polymer. Such compounds find utility as epoxy curatives, boiler scale removing agents, detergent builders, thickeners, additives for coatings and adhesives, ion exchange resins, and water-soluble resins to name a few. In various applications, prior art anhydride containing polymers are ineffective or demonstrate reduced effectiveness because the succinic anhydride is part of the backbone of the polymer. Thus, the anhydride is physically hidden or obscured or other groups on the polymer backbone interfere in some way with the reaction of the anhydride group. In addition, these polymers tend to be less flexible and less soluble in common organic solvents than desired. This is particularly disadvantageous where the polymer is used as part of a coating system or as an epoxy curative.

Therefore, it is an object of the present invention to produce a polymer which includes succinic anhydride groups and in which the succinic anhydride groups do not form a part of the polymer backbone.

This is accomplished by reacting an alkenyl succinic anhydride having the following formula:

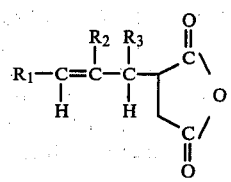

wherein $R_1$, $R_2$, and $R_3$ are selected from the following groups: substituted and unsubstituted alkyl, substituted and unsubstituted aryl with a vinyl monomer such as maleic anhydride or styrene in the presence of a free radical catalyst. The polymer formed includes succinic anhydride groups which are not part of the polymer backbone.

DETAILED DESCRIPTION

Alkenyl succinic anhydrides are well known. The alkenyl succinic anhydride useful in the present reaction has the formula:

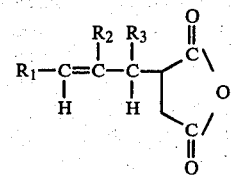

Throughout this application, $R_1$, $R_2$, and $R_3$ are used consistently and represent H, substituted and unsubstituted alkyl, and substituted or unsubstituted aryl. Specifically, excluded from this group are such groups which would interfere with the polymerization step discussed below or which would react with the anhydride group during the formation of the alkenyl succinic anhydride or during the polymerization step. Groups which are known to react with the anhydride group include hydroxyl, thiol, epoxy, and primary and secondary amines.

These compounds can be formed by reacting maleic anhydride with an olefin having the following formula:

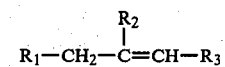

Typically, the reaction is conducted in an aromatic solvent at 220° C. for a period of 20 hours.

To produce the polymer of the present invention, the alkenyl succinic anhydride having the following formula:

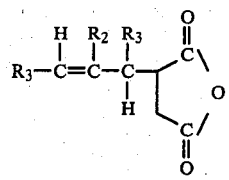

is reacted with one or more vinyl monomers which are capable of undergoing addition polymerization. Included are maleic anhydride, maleimides, substituted maleimides, styrene, vinyl acetate, alkyl vinyl ethers, and olefins. Specifically excluded are monomers containing a functional group which would react with the anhydride group, such as hydroxy, thiol, epoxy, and primary or secondary amine groups.

The alkenyl succinic anhydride can be copolymerized with other vinyl monomers by bulk, solution, suspension, or emulsion methods. These monomers do not readily homopolymerize; therefore, it is preferable to produce copolymers and terpolymers incorporating the alkenyl succinic anhydride.

The addition polymerization of the alkenyl succinic anhydride with other vinyl monomers is conducted in the presence of a polymerization initiator. Suitable initiators include organic peroxides such as tert-butyl hydroperoxide, di-tert butyl peroxide, cumene hydroperoxide, di-cumyl peroxide, benzoyl peroxide, and the like. Organic peroxygen compounds such as tert-butyl peracetate, tert-butyl perbenzoate, di-tert butyl perphthalate are also suitable as well as 2,2'-azodiisobutyronitrile.

Catalysts which are definitely unsuitable for this polymerization are Ziegler-type catalysts. These are catalysts which are made by reacting a compound of a transition metal chosen from Groups IV and VIII of the Periodic Table with an alkyl hydride, or a compound containing a metal from Groups I–III, for example, the reaction product of an aluminum alkyl with titanium tetrachloride. Such catalysts form irreversible bonds with the anhydride group and are quickly deactivated.

The novel polymerization of the present invention is carried out by heating the mixture of alkenyl succinic anhydride and other vinyl monomers to a temperature of 50° C. to 150° C. until polymerization is complete. The polymerization should be conducted in the presence of 0.01% to 5% and preferably 0.5% to 3% of a suitable free radical initiator as discussed above. This reaction can be carried out in the presence of a suitable inert solvent which refluxes within the desired temperature range such as xylene, toluene or benzene. Alternately, a liquid vinyl monomer such as styrene can be employed as solvent. In order to prevent oxidation of the respective monomers, this reaction is preferably conducted in an inert atmosphere such as helium or nitrogen which is preferred.

This reaction can be more fully understood through the following examples.

EXAMPLE I

Copolymer of Isobutenyl Succinic Anhydride and Maleic Anhydride

A mixture of 308 grams of isobutenyl succinic anhydride, 198 grams maleic anhydride, together with 10 grams di-tert butyl peroxide and 330 grams xylene was placed in a three liter kettle equipped with a stirrer, nitrogen inlet, thermometer, and condenser. The mixture was heated with stirring under nitrogen to 145° to 147° C. and held at this temperature range for two hours. A first boost of the 1 gram di-tert butyl peroxide was added and the mixture heated an additional two hours. A second boost of 1 gram di-tert butyl peroxide was then added and heated an additional two hours. The reaction mixture was then cooled and the polymer which had precipitated during the reaction was removed. Three grams of di-tert butyl peroxide in 12 grams of xylene was added to the xylene solution, and the solution reheated to 145° to 147° C. and held there for four hours. This mixture was then cooled and the solid polymer which had formed was recovered and added to the previously recovered polymer in a reactor with fresh xylene and heated to 70° to 80° C. for six hours.

After cooling, the polymer was filtered, ground up and dried. The yield of polymer was 407 grams (80%). The number average molecular weight as determined by vapor pressure osmometry in acetone at 30° C. was 800–850.

EXAMPLE II

Terpolymer of Isobutenyl Succinic Anhydride, Maleic Anhydride and Styrene

As described previously, a mixture of 30 g. isobutenyl succinic anhydride, 19.1 g. maleic anhydride and 0.51 g. 2, 2'-asodiisobutyronitrile was stirred and heated under nitrogen at 75°–80° C. Over two hours, 7.2 g. of styrene in 7.2 g. xylene was added to the reactor. After the styrene solution was added, the reaction mixture was heated for an additional hour at 78° C. The polymer which precipitated from solution was collected, dissolved in acetone and re-precipitated from diethyl ether, yielding 42.2 g. (75%) of terpolymer.

EXAMPLE III

Copolymer of Allylsuccinic Anhydride and N-Phenylmaleimide

A mixture of 5.0 g. allylsuccinic anhydride, 6.18 g. n-phenlymaleimide, 0.34 g. t-butyl perbenzoate was dissolved in 2.51 g. acetic acid and 0.28 g. acetic anhydride. The mixture was heated to 120° C. under nitrogen and held there for two hours. A solution of 0.22 g. t-butyl perbenzoate dissolved in 2.51 g. acetic acid and 0.28 acetic anhydride was then added. The polymerization mixture was heated an additional five hours. Upon cooling, the reaction mixture solidified. The solid mixture was dissolved in acetone and precipitated into diethyl ether, yielding 8.9 g. (80%) of copolymer.

EXAMPLE IV

Copolymer of Isobutenylsuccinic Anhydride and N-Phenylmaleimide

A mixture of 55.0 g. isobutenylsuccinic anhydride, 61.78 n-phenylmaleimide, 2.33 g. 2,2'-azodiisobutyronitrile was combined with 32.20 g. cyclohexanone. The reaction mixture was heated under nitrogen at 80°–82° C. for two hours. A solution of 2.33 g. 2, 2'-azodiisobutyronitrile dissolved in 7.62 g. cyclohexanone was then added. Heating was continued an additional five hours. The reaction mixture was cooled, diluted with 60 ml acetone and precipitated into diethyl ether, yielding 61.78 g. (53%) of copolymer.

The copolymers and terpolymers formed in these four examples demonstrate improved utility over prior art polymers which contain an anhydride group. Typically, anhydrides containing polymers are used as epoxy curatives, detergent builders, boiler scale removal agents, additives for coatings and adhesives, ion exchange resins, and water soluble polymers.

Although prior art anhydride containing monomers are used for these purposes, since the anhydride group in the polymers of the present invention are not directly attached to the polymer backbone, the end products tend to be more flexible when cured or more reactive or both.

Epoxy Curative

Anhydrides are commonly used as curatives for epoxy resins. Accordingly, the polymers of the present invention are capable of curing epoxy resins, thereby forming excellent coatings and adhesives. Since the anhydride group is attached to a polymer chain, the cured epoxy resin is particularly strong. But, since the anhydride is attached to the polymer backbone by means of an alkyl group, the cured resin is more flexible than resins cured by typical anhydride containing curatives.

The proportion of anhydride to epoxy group will vary according to the epoxy resin used as well as the polymer curative. In practice, the ratio of anhydride equivalent to epoxy equivalent has been empirically determined to be about 0.85/1 for most anyhdrides. More highly acid anhydrides perform best at a lower ratio. For most non-glycidyl epoxy resins, an anhydride/epoxy ratio of 0.5 to 0.75/1 is generally found to produce optimum results.

Curing an epoxy resin with an anhydride generally requires elevated temperatures of from 120° to 180° C.

To cure epoxy resins with polymers made from alkenyl succinic anhydride, the polymers are dissolved in an appropriate volatile, organic solvent such as acetone, cyclohexanone or chloroform and admixed with an epoxy resin. If the epoxy resin is more viscous than desired, a reactive diluent such as butyl glycidyl ether can be used.

After mixing the epoxy and the anhydride curative, any solvent which is present is evaporated off and the temperature increased to 120° to 180° C. until the resin has cured. This process can be further understood from the following examples which disclose the curing of an epoxy resin referred to as Epon 828. Epon resins are a type of epoxy resin produced by Shell Chemical Company. The Epon 828 resin has a general chemical structure as follows:

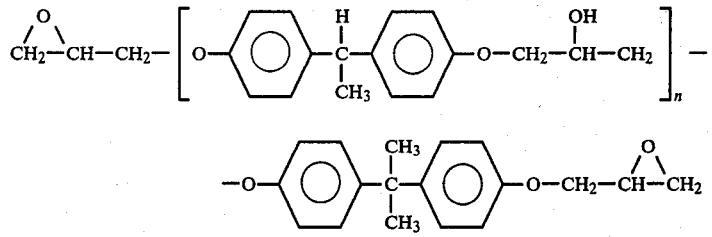

Approximately 185–190 grams of Epon 828 resin contain 1 gram equivalent of epoxide.

EXAMPLE V

Epoxy Cure Study

Poly (isobutenylsuccinic anhydride-co-maleic anhydride) prepared in Example I was dissolved in a 50:50 (w/w) mixture of acetone and cyclohexanone to form a 50% solids solution. 50.6 g. (0.04 equiv.) of this solution was blended with 3.80 g. (0.02 equiv.) Epon 828. Three mil wet films were cast on cold roll steel and glass. The films were cured in a forced air oven at 100° F. for 30 min., then 300° F. for 60 min. The properties of the cured films are outlined in Table 1.

TABLE 1

| Substrate | % Nonvolatiles | Sward Hardness | 100 Rub MEK Test | Adhesion (Crosshatch) | Impact Front | Reverse |
|---|---|---|---|---|---|---|
| Glass | 64 | 58 | Pass 100 | 100% | | |
| Cold Roll Steel | 64 | | Pass 100 | 100% | 20 | 0 |

EXAMPLE VI

Epoxy Cure Study

A solution of 2.3 g. (0.036 equiv.) of poly (isobutenyl succinic anhydride-co-maleic anhydride) prepared in Example 1 in 1.5 g. of a 1:1:1 by weight mixture of chloroform, cyclohexanone and acetone was prepared. This solution was blended with 1.72 g. (0.009 equiv.) Epon 828 and 1.18 g. (0.009 equiv.) butyl glycidyl ether. Three mil wet films were cast on glass and cold roll steel. The films cured in a forced air oven at 100° F. for 30 minutes, then 300° F. for 60 minutes. The properties of the cured films are shown in Table 2.

TABLE 2

| Substrate | % Nonvolatiles | Sward Hardness | 100 Rub MEK Test | Adhesion (Crosshatch) | Impact Front | Reverse |
|---|---|---|---|---|---|---|
| Glass | 78 | 26 | Pass 100 | 100% | | |
| Cold Roll Steel | 78 | | Pass 100 | 100% | 25 | 0 |

EXAMPLE VII

Epoxy Cure Study

The terpolymer of isobutenyl succinic anhydride, maleic anhydride and styrene prepared in Example II was dissolved in a 50:50 by weight mixture of acetone and cyclohexanone to form a 50% solids solution. 4.0 g. of this polymer solution was blended with 2.4 g. Epon 828. Three mil wet films were cast onto glass and cold roll steel. The films were cured in a forced air oven at 100° F. for 30 minutes, the 300° F. for 60 minutes. The properties of the cured films are outlined in Table 3.

TABLE 3

| Substrate | % Nonvolatiles | 100 Rub MEK Test | Adhesion (Crosshatch) | Impact Front | Reverse |
|---|---|---|---|---|---|
| Glass | 69 | Pass 85 | 100% | | |
| Cold Roll Steel | 69 | Pass 100 | 100% | 15 | 0 |

The polymers of the present invention are also excellent boiler scale removers. In addition, these polymers are useful as ion exchange resins. These resins are more reactive than prior art resins because the reaction site, i.e., the anhydride group is attached to the polymer at a side chain as opposed to being a part of the polymer backbone. Thus, the polymer backbone is less likely to interfere with the anhydride.

Copolymers of the present invention also provide excellent detergent builders when hydrolyzed. Since these polymers are water soluble, they also provide excellent thickeners in aqueous solutions. Furthermore, these polymers can be used as coatings when cross-linked with, for example, a primary amine, as boiler scale removal agents, and for fiber sizing. The method of using the polymers of the present invention for these uses would be well known to those skilled in the respective arts.

Having thus described the invention, we claim:

1. A copolymer comprising the free radical initiated addition polymerization product of a first monomer having the following formula:

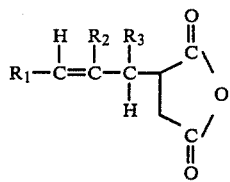

were $R_1$, $R_2$ and $R_3$ each represent H, substituted or unsubstituted alkyl and substituted or unsubstituted aryl; and a second vinyl monomer selected from the group consisting of maleic anhydride, maleimide and substituted maleimides.

2. A copolymer as claimed in claim 1 wherein $R_3$ and $R_1$ represent H and $R_2$ represents —$CH_3$.

3. The copolymer claimed in claim 1 wherein said second monomer is maleic anhydride.

4. The copolymer claimed in claim 1 wherein said second monomer is maleimide.

5. A terpolymer comprising the free radical initiated copolymerization product of a first monomer, a second and a third monomer, said first monomer having the following formula:

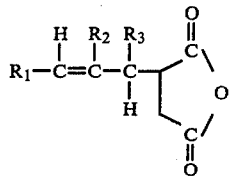

wherein $R_1$, $R_2$ and $R_3$ each represent hydrogen, substituted or unsubstituted alkyl and substituted or unsubstituted aryl;

said second monomer is maleic anhydride; and said third monomer comprises a vinyl monomer capable of undergoing free radical initiated copolymerization.

6. A copolymer comprising the polymerization product of isobutenyl succinic anhydride and maleic anhydride.

7. A terpolymer comprising the polymerization product of isobutenyl succinic anhydride, maleic anhydride and styrene.

8. A terpolymer comprising the polymerization product of a first monomer having the following formula:

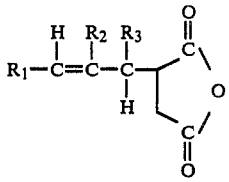

wherein $R_1$, $R_2$ and $R_3$ each represent hydrogen, substituted or unsubstituted alkyl and substituted or unsubstituted aryl; and maleic anhydride and styrene.

9. A terpolymer as claimed in claim 8 wherein $R_1$ and $R_3$ represents H and $R_2$ represents —$CH_3$.

* * * * *